Oct. 13, 1964     E. W. KAMP     3,152,832
WEATHER SHIELD FOR AUTOMOBILE WINDSHIELDS
Filed Oct. 14, 1963     2 Sheets-Sheet 1
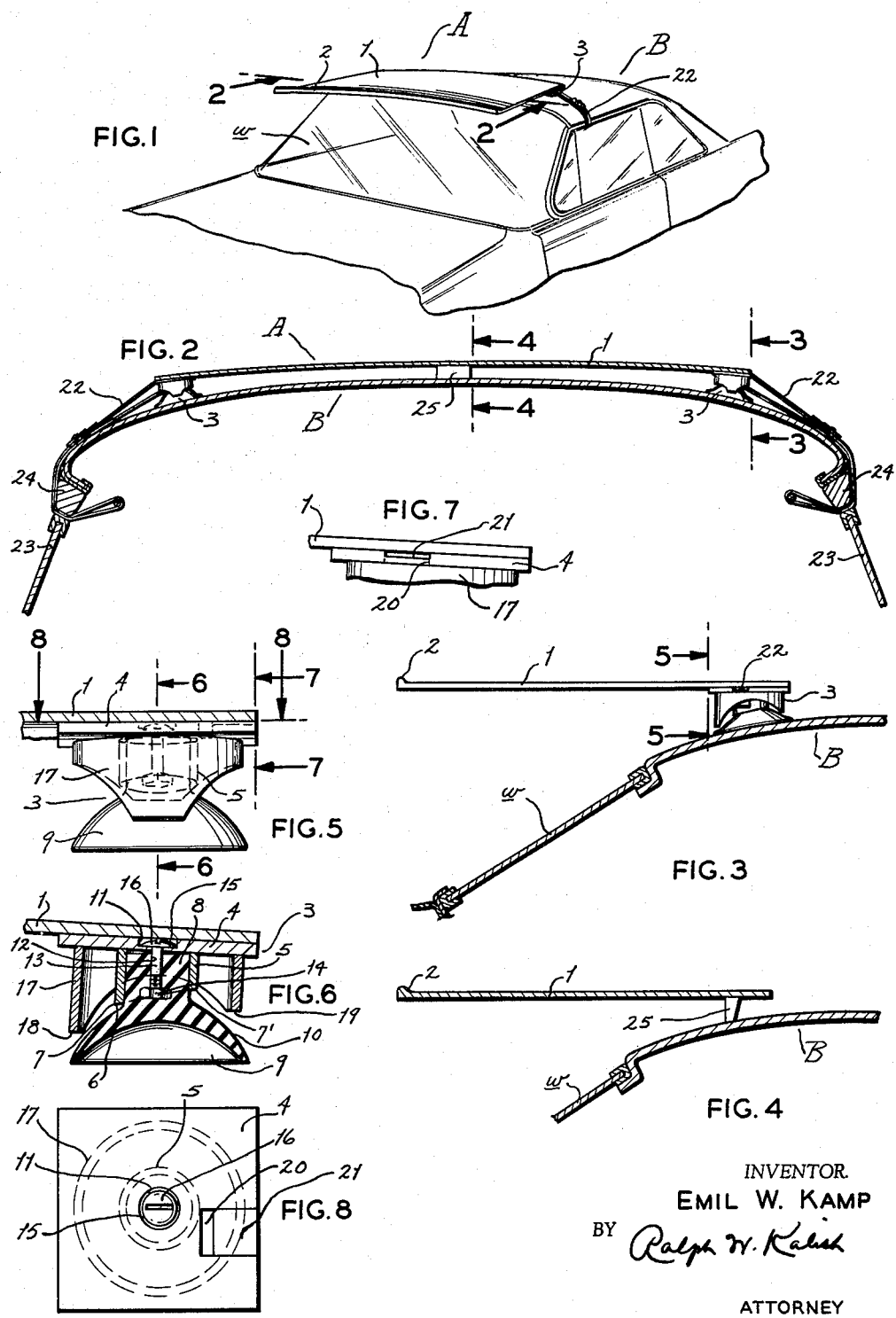
INVENTOR.
EMIL W. KAMP
BY Ralph W. Kalish
ATTORNEY Oct. 13, 1964 E. W. KAMP 3,152,832
WEATHER SHIELD FOR AUTOMOBILE WINDSHIELDS
Filed Oct. 14, 1963 2 Sheets-Sheet 2

INVENTOR.
EMIL W. KAMP
BY Ralph W. Kalish
ATTORNEY

United States Patent Office 3,152,832
Patented Oct. 13, 1964

3,152,832
WEATHER SHIELD FOR AUTOMOBILE
WINDSHIELDS
Emil W. Kamp, 242 Palm Drive, Hazelwood, Mo.
Filed Oct. 14, 1963, Ser. No. 315,824
10 Claims. (Cl. 296—95)

This invention relates in general to automobiles and, more particularly, to a weather shield for protecting the windshield against precipitation.

It is an object of the present invention to provide a weather shield adapted for engagement upon automobiles to protect the windshields thereof against precipitation, as rain, snow and the like, when the vehicle is parked, as in a drive-in-theatre, in order to present the occupants with a clear view while obviating the necessity of running the motor for operating the windshield wipers.

It is another object of the present invention to provide a weather shield of the character stated, which is adapted for detachable engagement upon automobiles, and which is so designed as to be equally useful with all styles and sizes of automobiles.

It is a further object of the present invention to provide a weather shield for automobiles, which, in operative position, provides full protective coverage for the windshield in projecting forwardly beyond same and in overlying relationship thereto; and which incorporates means for rendering same resistant to both lifting and depressing forces exerted thereon by inclement weather.

It is an additional object of the present invention to provide an automobile weather shield embodying means tending to disperse precipitation received thereon laterally for insuring maximum visibility.

It is a still further object of the present invention to provide a weather shield of the character stated having a simplicity of parts; which is sturdy in construction for repeated, durable usage; which is designed for rapid and facile mounting on a vehicle; and which may be produced economically.

Other objects and details of the invention will be apparent from the following description, when read in connection with the accompanying drawings (two sheets) wherein—

FIGURE 1 is a perspective view of an automobile weather shield constructed in accordance with and embodying the present invention, illustrating the same in mounted position for usage upon an automobile.

FIGURE 2 is a horizontal transverse section taken on the line 2—2 of FIGURE 1.

FIGURE 3 is a vertical transverse sectional view taken on the line 3—3 of FIGURE 2.

FIGURE 4 is a vertical transverse section taken on the line 4—4 of FIGURE 2.

FIGURE 5 is a vertical transverse section taken on the line 5—5 of FIGURE 3.

FIGURE 6 is a vertical transverse section taken substantially on the line 6—6 of FIGURE 5, but showing the mounting cup and associated parts in disengaged condition.

FIGURE 7 is a fragmentary side elevational view taken on the line 7—7 of FIGURE 5.

FIGURE 8 is a horizontal transverse section taken on the line 8—8 of FIGURE 5.

Figure 9:
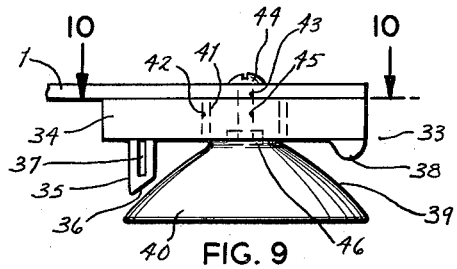
FIGURE 9 is a side elevational view of another form of a weather shield mounting member constructed in accordance with and embodying the present invention.

Referring now by reference characters to the drawings which illustrate practical embodiments of the present invention, A generally designates a weather shield adapted for detachable engagement upon an automobile, as indicated at B, for protecting the vehicle's windshield w from precipitation, such as rain, snow, sleet and the like, in order that maximum visibility be maintained therethrough when automobile B is positioned for viewing by its occupants as of a spectacle or event, such as at a drive-in-theatre, parade, sporting event, etc., thereby obviating the necessity of running the automobile's motor for windshield wiper operation.

Weather shield A may be constructed of varying dimensions for accommodating automobiles of the myriad types and styles extant, and comprises a flat panel 1 fabricated preferably from plastic material, having an inherent resiliency and being of such transverse extent as to substantially coincide with windshield w, and being of such dimension from its rearward edge to the forward edge as to coveringly overlay windshield w (see FIGURE 3). Formed on the forward end edge of panel 1 is an upwardly projecting lip 2 for inhibiting flow over such edge of precipitation received upon panel 1, and to, thus, direct same for lateral flow over the side edges of said panel 1.

Weather shield A is mountable upon the roof of automobile B by means of a pair of mounting members 3 located at opposite rearward corners of said panel. Each mounting member 3 comprises a top plate 4 constructed of preferably a rigid plastic material and being fixed to the confronting under surface portion of panel 1. Secured to, and depending from, each top plate 4, substantially centrally thereof, is a downwardly opening, rigid sleeve 5, the lower end edge of which, as at 6, inclines upwardly and rearwardly, so that the forward end portion, as at 7, is downwardly and rearwardly of the diametrally opposite portion 7'. Sleeve 5 is dimensioned so that its inside diameter snugly accommodates the stem 8 of a suction cup 9 formed as of rubber or suitable flexible material. The length of stem 8 is less than the distance between top plate 4 and the forward edge portion 7 of sleeve 5, so that the latter will abut against the convex surface 10 of suction cup 9 for limiting the projection of stem 8 within sleeve 5. As the rearward portion of sleeve 5 is of less height than stem 8, the rearward edge 7' thereof will normally be spaced from the adjacent confronting portion of convex surface 10 of suction cup 9, whereby the upper end of stem 8 will be spaced in its forward portion from the under face of the related plate 4 and in contact therewith in its rearward portion (see FIGURE 6), so that plate 4 and, accordingly, panel 1 will incline upwardly and forwardly with respect to the plane of the upper end of stem 8. This upward bias of panel 1 will, in great part, compensate for the normal tendency of panel 1 to drop downwardly in its forward portion by virtue of its expanse, whereby said panel will be presented in a substantially horizontal disposition. Each plate 4 is provided with an aperture 11 aligned with a bore 12 provided axially within the related stem 8 for extension therethrough of a screw 13, which threadedly engages a nut 14 embedded within the base of stem 8. The said aperture 11 is provided with a countersunk shoulder 15 permitting head 16 of each screw 13 to be seated below the upper surface of the related plate 4 to prevent interference with flush contact between same and panel 1.

Secured about its upper edge to the under face of each plate 4, and in concentric relationship to sleeve 5, is an outer cylindrical member 17, being so contoured along its bottom margin as to provide a forward detent portion 18 and a rearward, relatively shorter detent section 19, which are in upwardly spaced relationship to diametrally opposite portions of convex surface 10 of suction cup 9; the forward detent 18 being, thus, normally in relatively immediate proximity to said surface 10. In their outer lateral portions, between the associated sleeve 5 and the outer cylindrical member 17, each top plate 4 is provided with a slot-like aperture 20, which at its upper end communicates with a relatively shallow recess 21 in the upper surface of plate 4 and extending between same and the adjacent side edge. Provided for extension through each aperture 20 is a strap 22, which is threaded upwardly between suction cup 9 and outer cylindrical member 17 through aperture 20 and outwardly along recess 21 for gripped engagement of the outer end portions of said strap between the upper edge of the vehicle side door 23 and the opposed header 24. Also, it is apparent that the said straps 22 may be clamped between the upper edge of the side door window and the top frame of the door, although such might result in a limited opening of the windows. The outer end portions of straps 22 may, if desired, be engaged about the support arm for the sun visor normally mounted in the inside of the vehicle forwardly of each front seat.

Depending from panel 1 centrally of its rearward edge portion and intermediate mounting members 2 is a spacer 25 of such height as to abut, on its lower end, the roof of the automobile B for limiting contact between panel 1 and said roof, thereby preventing any undesired marring of the finish of the roof. The lower edge of said spacer 25 may be suitably provided with cushioning material.

In usage, it is apparent that weather shield A may be easily mounted upon a car vehicle without requiring developed skill on the part of the user, since there is only requisite the locating of mounting members 3 to present panel 1 in desired protective position and to thereon merely apply downward pressure upon panel 1 immediately above mounting members 3, so as to bring suction cups 9 into reliable engagement with the automobile roof. Thereupon, straps 22 may be then led interiorly of the car and doors 23 closed. Panel 1 is thereby disposed in fully operative relation, so as to protect windshield $w$ against reception thereon of rain, snow, and the like and to assure desired visibility to the occupants for viewing purposes with the automobile in parked condition. As indicated above, the normal upward forward cant of panel 1 will tend to assure desired horizontal disposition of the same when in operative position. In the event of application upon panel 1 of any downward force, such as through the weight of the precipitation or by wind, the downward rocking of the same will be limited by the abutment of detent portion 18 upon the upper convex surface 10 of suction cup 9. Similarly, any upward force against the under surface of panel 1 will be limited by abutment of the rearward detent section 19 against said convex surface 10. Panel 1 is accorded a limited swingability, but through the unique interengagement between the detents 18, 19 and suction cups 9, forces acting upon said panel 1 are suitably resisted, so as to prevent panel 1 from attaining such degree of slant as might forceably disengage suction cups 9 from the automobile roof. Mounting members 3 are constructed in such a novel manner as to provide a maximum degree of stabilization to weather shield A, so as to provide reliability in usage hitherto unattained.

In view of the foregoing, it is readily seen that weather shield A is of most durable construction, so as to be resistant to wear; is easily mounted upon, and conversely dismounted from, a vehicle roof, so that the average motorist can enjoy the use of same; is particularly most stable in operative position for assuring full visibility through windshield $w$ at all times.

Figure 10:
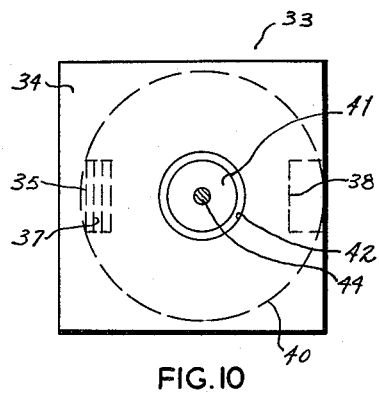
FIGURE 10 is a horizontal transverse section taken on the line 10—10 of FIGURE 9.

FIGURES 9 and 10 illustrate another form of mounting member 33 for securement to top panel 1. The said mounting member 33 comprises a relatively thick rectangular plate 34 suitably secured on its upper surface to the under face of panel 1 and having integrally formed therewith in its forward portion a depending, finger-like detent 35, the lower edge of which is rearwardly and upwardly inclined as at 36; said detent being centrally provided with a transversely extending slot-like aperture 37 for threading therethrough of a strap such as shown at 22 in FIGURE 2 above. Aligned with detent 35, and extending downwardly from the rearward portion of plate 34 is a knob-like projection 38, but being of relatively less length than detent 35. Said detent 35 and projection 38 overly confronting portions of the upper convex surface 39 of a suction cup 40, having a stem 41 received within a central recess 42 formed in plate 34 for abutment of the upper end of said stem 41 against the under face of panel 1; there being inserted within said recess 42 a bushing 42' for reinforcement purposes. Extending through an opening 54 in panel 1 is a screw 44 which is received within an axial bore 45 in stem 41 for threaded engagement within a nut 46 embedded within the base of said stem 41 for snug securement of suction cup 40 to panel 1. It will be seen that detent 35 and projection 38 act to limit tilting of panel 1 in the same manner as detents 18 and 19 of mounting members 3 hereinabove described.

Figure 11:
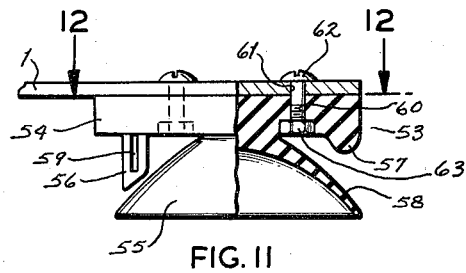
FIGURE 11 is a side elevational view, in partial section, of a further form of a weather shield mounting member constructed in accordance with and embodying the present invention.
Figure 12:
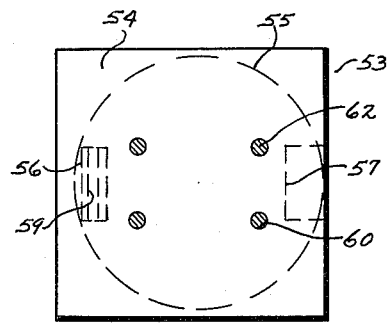
FIGURE 12 is a horizontal transverse section taken on the line 12—12 of FIGURE 11.

FIGURES 11 and 12 illustrate another form of mounting member 53 for use with weather shield A and the same comprises a unitarily molded top plate portion 54 and suction cup 55, as from rubber or like flexible material. Said top portion 54 embodies a forward depending detent 56 and a rearward, downwardly extending projection 57 in like relation to the upper surface 58 of suction cup 55 as detent 35 and projection 38 of mounting members 33 hereinabove described; and there being a strap-receiving aperture 59 in detent 56. Provided spacedly about said top section 54 between detent 56 and projection 57 is a plurality of upwardly opening recesses 60 registering with openings 61 in the overlying panel 1 for extension therethrough of retaining screws 62, the lower ends of which are threadedly received within nuts 63 suitably embedded within top portion 54.

Figure 13:
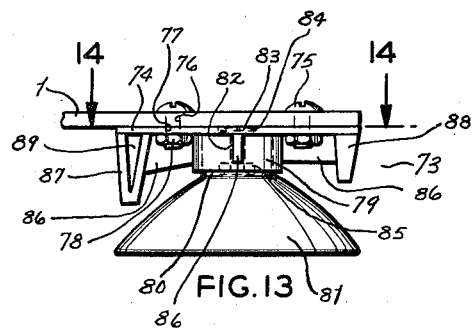
FIGURE 13 is a still further form of a weather shield mounting member constructed in accordance with and embodying the present invention.
Figure 14:
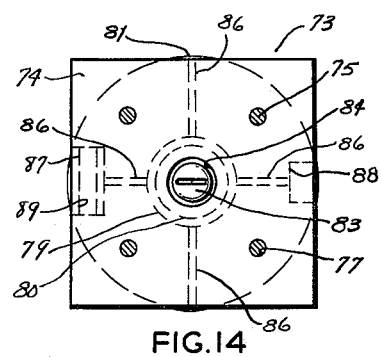
FIGURE 14 is a horizontal transverse section taken on the line 14—14 of FIGURE 13.

In FIGURES 13 and 14 there is illustrated another form of mounting member, indicated generally at 73, for utilization with panel 1 of weather shield A. The said mounting member 73 comprises a generally rectangular top plate 74, which is secured to the under surface of top panel 1 by means of a plurality of screws 75 extending through aligned openings 76, 77 in said panel 1 and top plate 74, respectively, with their lower projecting ends being threaded to nuts 78. Substantially centrally of top plate 74 and depending from the under surface thereof is a sleeve 79 formed of suitable rigid material and having an inside diameter for snug reception therein of the stem portion 80 of suction cup 81. Said stem 80 is provided with an axial bore 82 for receiving a screw 83, which projects downwardly through an aperture 84 in top plate 74; said screw 83 being engaged at its lower end within a nut 85 embedded in stem 80. Aperture 84 is provided with a countersink for reception of the head of screw 83. Extending radially from sleeve 79 is a plurality of circumferentially spaced apart reinforcing ribs 86 which are suitably caused to adhere on their upper surface to the under face of top plate 74. Centrally of the forward end portion of top plate 74 and depending therefrom is a detent 87, while a relatively narrower and shorter detent 88 similarly depends from the central rearward portion of top plate 74. Said detents 87 and 88 are related to suction cups 81 and coact therewith in the same manner as detents 18, 19, respectively, with respect to suction cups 9 as described hereinabove. Each detent 87, 88 is of generally tapered form, being narrower at their lower ends. Detent 87 is provided with a transverse aperture 89 of general triangular cross section for threading therethrough of a retaining strap, such as strap 22 described hereinabove. It will be further noted that a rib 86 extends between sleeve 79 and each detent 87, 88 for further rigidifying the structure.

In view of the foregoing, it will be seen that weather shield A may be used with any of the above described mounting members 3, 33, 53 and 73, and that the same do provide wide ranges of selectivity for economical, high volume manufacture.

In order to enhance the rigidity of the various mounting members of the present invention, the respective bores and recesses for the retaining screws, such as bores 12, 45 and 82 and recesses 60, will normally have an inside diameter slightly less than the outside diameter of the screws received therein so that said latter will tend to force the surrounding portions of the stems and base portions of the various suction cups radially outwardly for forming a firm retentive engagement with the adjacent, confronting surface portions of the mounting members.

It should be understood that changes and modifications in the formation, construction, arrangement, and combination of the several parts of the Weather Shield for Automobiles may be made and substituted for these herein shown and described with out departing from the nature and principle of my invention.

Having thus described my invention, what I claim and desire to secure by Letters Patent is:

1. A weather shield for protecting the windshields of automobiles against precipitation while allowing full visibility therethrough, comprising a flat panel having a width substantially coextensive of the windshield to be accommodated and a length sufficient for overlying the windshield when said weather shield is in operative position, mounting members provided for securing said panel on its under rearward surface to the roof of the automobile to be serviced, each mounting member comprising a suction cup, a stem projecting upwardly from said suction cup, said stem and suction cup being formed of resilient material for flexing of said stem about a vertical axis, means for engaging said stem to said panel, and detent members in depending relationship to said panel and located spacedly from said means for attaching said stem to said panel, the lower portions of said detent members being in overlying relationship to the upper surface of the suction cup for engaging same upon tilting of the stem about said vertical axis responsive to pressures applied upon the panel during usage.

2. A weather shield as defined in claim 1 and further characterized by said means for securing said stem to the panel comprising a downwardly opening sleeve member extending from the under surface of the panel, means for securing said stem within said sleeve member, and said detent members being located forwardly and rearwardly of said sleeve member in radially outwardly spaced relationship thereto.

3. A weather shield as defined in claim 2 and further characterized by the lower end of said sleeve being forwardly and downwardly inclined.

4. A weather shield for protecting the windshields of automobiles as defined in claim 2 and further characterized by said forward detent being of greater length than said rearward detent.

5. A weather shield as defined in claim 1 and further characterized by each mounting member comprising a plate and a suction cup integrally formed of resilient material, means securing said plate to the undersurface of said panel, and a forward and a rearward detent member integrally formed with said plate and depending therefrom in overlying relationship to the upper surface of said cup.

6. A weather shield as defined in claim 5 and further characterized by said forward detent member being of greater length than said rearward detent member.

7. A weather shield for protecting the windshields of automobiles as defined in claim 1 and further characterized by each mounting member comprising a plate and suction cup integrally formed of resilient material, screws securing said plate to the under face of said panel, a forward and a rearward detent member integrally formed with said plate and depending therefrom in overlying relationship to the upper surface of said cup.

8. A weather shield for protecting the windshields of automobiles as defined in claim 1 and further characterized by each mounting member comprising a top plate fixed on its upper surface to the under face of said panel, said plate having a central recess, a suction cup having a stem being integrally molded of flexible material, said stem being engaged within said recess, forward and rearward detent members extending downwardly from said top plate and being integrally formed therewith, said forward detent member being of greater length than said rearward detent member.

9. A weather shield for protecting the windshields of automobiles as defined in claim 1 and further characterized by each mounting member comprising a top plate, fastening members engaging said top plate to the under surface of said panel, a downwardly opening sleeve member fixed to said top plate, a suction cup having a stem and being integrally formed of resilient material, said stem being received within said sleeve member, means securing said stem within said sleeve member, a forward and a rearward detent member extending downwardly from said top plate in radially outwardly spaced relationship to said sleeve, the lower ends of said forward and rearward detent members being in overlying relationship to the upper surface of said suction cup for engaging same upon tilting of the stem responsive to pressures applied upon the panel during usage, and reinforcing ribs provided between said sleeve member and said forward and rearward detent members.

10. A weather shield for protecting the windshields of automobiles as defined in claim 1 and further characterized by each mounting member comprising a top plate fixed to the under surface of the panel, a sleeve member rigid with said top plate and depending centrally therefrom, the lower edge of said sleeve being upwardly and rearwardly inclined so that the forward portion thereof depends further downwardly than the rearward portion, a suction cup having a stem being formed of resilient material for flexibility about its vertical axis, said stem being received within said sleeve member, means for maintaining said stem snugly within said sleeve, the length of said stem being less than the length of the forward portion of said sleeve and being greater than the length of the rearward portion of said sleeve whereby its upper surface will abut in its rearward portion against the under face of the top plate and the forward portion of the upper end of said stem will be spaced therefrom so as to cause said top plate and affixed panel to be normally disposed in upwardly and forwardly inclined relation to the horizontal.

References Cited in the file of this patent

UNITED STATES PATENTS

| | | |
|---|---|---|
| 1,852,449 | Dempsey | Apr. 5, 1932 |
| 2,496,085 | Engelheart | Jan. 31, 1950 |
| 2,606,381 | Wilson | Aug. 12, 1952 |
| 2,633,381 | Francesco | Mar. 31, 1953 |
| 2,653,050 | Ashcraft | Sept. 22, 1953 |
| 2,743,729 | Butler | May 1, 1956 |
| 2,897,002 | Yovich | July 28, 1959 |